(12) United States Patent
Anim-Appiah et al.

(10) Patent No.: US 7,295,517 B2
(45) Date of Patent: Nov. 13, 2007

(54) METHOD AND APPARATUS FOR CHANNEL QUALITY METRIC GENERATION WITHIN A PACKET-BASED MULTICARRIER MODULATION COMMUNICATION SYSTEM

(75) Inventors: Kofi D. Anim-Appiah, Allen, TX (US); Richard G. C. Williams, San Diego, CA (US); Anuj Batra, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1006 days.

(21) Appl. No.: 10/384,944

(22) Filed: Mar. 10, 2003

(65) Prior Publication Data
US 2004/0100898 A1 May 27, 2004

Related U.S. Application Data

(60) Provisional application No. 60/429,771, filed on Nov. 27, 2002.

(51) Int. Cl.
*H04J 3/16* (2006.01)
(52) U.S. Cl. .................. 370/232; 370/208; 370/344; 370/480; 375/134; 375/137; 375/345
(58) Field of Classification Search ............... 370/208, 370/229, 232, 241–252, 329, 344, 480; 375/134, 375/137, 260, 341, 345
See application file for complete search history.

(56) References Cited

U.S. PATENT DOCUMENTS

| 5,822,380 | A | | 10/1998 | Bottomley | 375/347 |
| 5,911,120 | A | * | 6/1999 | Jarett et al. | 455/417 |
| 6,002,715 | A | * | 12/1999 | Brailean et al. | 375/227 |
| 6,058,107 | A | * | 5/2000 | Love et al. | 370/332 |
| 6,108,517 | A | | 8/2000 | Arslan et al. | 455/21 |
| 6,185,266 | B1 | * | 2/2001 | Kuchi et al. | 375/347 |
| 6,442,129 | B1 | | 8/2002 | Yonge, III et al. | 370/204 |
| 2004/0053592 | A1 | * | 3/2004 | Reial | 455/303 |

FOREIGN PATENT DOCUMENTS

EP    1176750 A1    1/2003

* cited by examiner

*Primary Examiner*—Hassan Kizou
*Assistant Examiner*—Bo Hui A Zhu
(74) *Attorney, Agent, or Firm*—Steven A. Shaw; W. James Brady; Frederick J. Telecky, Jr.

(57) ABSTRACT

A communication system includes a receiver having a variable gain module and a baseband processor. The baseband processor measures the power of the signal received and derives a variable gain control setting that is inversely proportional to the power of that signal and sends the variable gain control setting to the variable gain module. The baseband processor generates a channel quality metric that is equivalent to the normalized geometric mean of the squared magnitudes of the gain estimation, divided by the total noise-plus-interference power.

22 Claims, 2 Drawing Sheets

METHOD AND APPARATUS FOR CHANNEL QUALITY METRIC GENERATION WITHIN A PACKET-BASED MULTICARRIER MODULATION COMMUNICATION SYSTEM

CROSS REFERENCE TO RELATED APPLICATIONS

This application is related and claims priority under 35 U.S.C. 119(e) to "Method and Apparatus for Channel Quality Metric Generation Within A Packet-Based Multicarrier Modulation Communication System", U.S. Provisional Application No. 60/429,771 filed Nov. 27, 2002.

FIELD OF THE INVENTION

The present invention relates to communication systems for general information transmission, and, more particularly, to a packet-based communication system whose physical layer is based on multicarrier modulation.

BACKGROUND OF THE INVENTION

The world-wide growth of frequency spectrum efficient communications systems and the enhancement of their performance has increased the number of individual users and data transmission rates for these systems. Packet-based communication systems whose physical layers are based on multicarrier modulation are commonly referred to as OFDM (Orthogonal Frequency Division Multiplexing) or DMT (Discrete MultiTone) systems. The available transmission channel bandwidth within an OFDM system is subdivided into a number of discrete channels or carriers. Even though these channels overlap, they are orthogonal to each other. Data is transmitted in the form of symbols that have a predetermined duration and encompass some number of carrier frequencies. Systems in compliance with IEEE 802.11a and 802.11g wireless LAN standards are well-known examples of such systems.

The conventional structure of packets in a packet-based data transmission system comprises a preamble, a header, and a data payload. The preamble is typically used to estimate the channel impulse response, derive settings for the automatic gain control circuits, and perform carrier frequency offset estimation. It is also used for synchronization and other physical layer functions. The header is typically used for conveying information about variable physical layer parameters such as the size of the data payload and the type of modulation being employed for a particular packet.

Transmission properties, in general, and the impulse response, in particular, of wireless communication channels are time-varying statistical quantities. These variations in channel conditions are caused by several factors which include but are not limited to relative movement between the transmitter and receiver and movement of objects such as automobiles, people, portable office furniture, etc. in the vicinity of either the transmitter, receiver, or both. An example may include the use of a subscriber terminal within a wireless communication system in an automobile. The quality of the connection is extremely high since the subscriber terminal has a direct visual connection to the antenna of a base station within the system. Next, a truck moves in front of the automobile, blocking the direct visual connection to the antenna. Consequently, the quality of the wireless connection degrades, which is detected by the base station system in connection with channel estimation. Therefore, even when the transmit and receive antennas are both fixed spatially, the channel between them can still vary with time.

In such a wireless data transmission system, these variations in the channel response result in a corresponding variation in the short-term data rate that can be supported by the channel. Thus, the design of most data communication systems enable communication on the wireless channel at different data rates. When the signaltonoise ratio (SNR) is high for a particular channel, the channel quality is deemed to be good. Thereby, higher data rates are used on this specific channel. When the SNR is low, however, channel conditions are poor and, as a result, lower data rates are selected for the specific channel. "Noise" as defined here with respect to the SNR is understood to include receiver thermal noise as well as radio frequency interference (RFI) in the passband of the communication system. These varying data rates for each packet are selected either manually by the user or automatically by the system. In either case, some method and apparatus for estimating channel quality is required.

Channel quality metrics are used to estimate channel quality and thereby select the appropriate data rates. Most channel quality metrics are related to or estimated from the SNR measured at the receiver in an effort to set the data transmission rates of each channel. A conventional approach uses the average SNR over several packets to calculate the channel quality metric. As a result, either a large number of short packets or a small amount of long packets must be obtained to provide a reliable average SNR. Thus, in many wireless data communication systems, accurate measurement of the received SNR is difficult to achieve over a short period of time.

Moreover, to add to the complexity of the derivation of the SNR, within OFDM-based systems, there are multiple SNRs that correspond to multiple sub-channels within a channel. There are numerous approaches towards the combination or averaging of all the SNRs corresponding to each sub-channel to arrive at one quality metric for a particular channel. Some approaches use either the minimum value or the maximum value of each SNR in lieu of the arithmetic average of all SNRs within a given channel.

In an ideal situation, the channel impulse response remains constant for at least two packet-transmission durations. In this case, the channel is understood to have a coherence time that exceeds the duration of two packets. Accordingly, a receiving station may be able to estimate the channel quality from a received packet and select an appropriate transmission rate for its next transmission back to the station that sent the packet. This scenario, however, relies upon symmetry in the channel conditions between the transmitter and the receiver.

A known approach for estimating the SNR uses other metrics, such as the packet error rate (PER), where the PER is a function of the SNR. Typically, the operating PER in modern wireless data communication systems is 1%. Thus, a large amount of packets are necessary to measure the operating PER with reasonable accuracy. As such, this method for estimation can take a considerable amount of time.

Other approaches use the Viterbi decoder path metric to estimate the average SNR in IEEE 802.11-type OFDM physical layer. This estimation, however, requires an extensive amount of time to obtain reliable values of the SNR for each channel. Accordingly, the adaptation of data rates with respect to these SNR estimations is slow.

Thus, in order to increase the long-term average data transmission rates on communication systems whose channel impulse response is time-variant, it is necessary to be able to adapt data transmission rates more quickly with respect to changing channel conditions. This requires metrics for which reliable estimates can be obtained quickly. Since most modern packet-based wireless data communication systems support packets of varying length, it is desirable for the fidelity of the computed metrics to be largely independent of packet length. In the alternative, it is desirable for the fidelity to be guaranteed for the smallest expected packet.

The present invention is directed to overcoming, or at least reducing the effects of one or more of the problems set forth above.

SUMMARY OF THE INVENTION

To address the above-discussed deficiencies of channel quality estimation, the present invention teaches a communication system having a channel quality estimation module that determines the channel quality metric utilizing the preamble portion of the packet only. Data, in such a communication system, is transmitted in the form of a packet over a data channel during a packet transmission, wherein each data channel includes several sub-channels. A receiver in such communication system demodulates the data signal it receives for further processing. The receiver includes a variable gain module and a baseband processor. The variable gain module receives each packet transmitted to provide a plurality of baseband sample signals. The baseband processor has several functions. Specifically, the baseband processor measures the power of the signal received and derives a variable gain control setting $v_{AGC}$ that is inversely proportional to the power of the signal. The variable gain module couples to the baseband processor to receive the variable gain control setting $v_{AGC}$ during the processing of the preamble of each packet to provide a partially demodulated signal y(t) of constant energy. Further, the baseband processor calculates the gain estimation $h_i$ of each sub-channel and calculates the noise-plus-interference power $P_{ni}$. Moreover, the baseband processor generates a channel quality metric M that is equivalent to the normalized geometric mean of the squared magnitudes of the gain estimation $h_i$. When interference is present in the channel, the channel quality metric M is divided by the total noise-plus-interference power $P_{ni}$. The channel quality metric M of this first embodiment is equivalent to the following:

$$M = \frac{1}{P_{ni} v_{AGC}} \left( \prod_{i=1}^{s_d} |h_i|^2 \right)^{\frac{1}{s_d}} = \frac{1}{P_{ni} v_{AGC}} \left( \prod_{i=1}^{s_d} |h_i| \right)^{\frac{2}{s_d}} \quad [1]$$

where $s_d$ is the number of sub-channels having data.

In a second embodiment, the receiver includes at least one antenna, a radio frequency (RF) processor and a baseband processor. In operation, the antenna receives the RF signal and provides a corresponding antenna signal to the RF processor. The RF processor provides a plurality of baseband sample signals from the antenna signal. The baseband processor couples to the RF processor to process each baseband sample signal. The baseband processor has several functions. Specifically, the baseband processor measures the power of the RF signal and derives a variable gain control setting $v_{AGC}$ that is inversely proportional to the power of the RF signal. The RF processor couples to the baseband processor to receive the variable gain control setting $v_{AGC}$ during the processing the preamble of each packet to provide a partially demodulated signal y(t) of constant energy. Further, the baseband processor calculates the gain estimation $h_i$ of each sub channel and calculates the noise-plus-interference power $P_{ni}$. Moreover, the baseband processor generates a channel quality metric M for each sub-channel that is equivalent to the normalized geometric mean of the squared magnitudes of the gain estimation $h_i$. When interference is present in the channel, the channel quality metric M is divided by the total noise-plus-interference power $P_{ni}$. The channel quality metric M of this second embodiment is equivalent to the following:

$$M = \frac{1}{P_{ni} v_{AGC}} \left( \prod_{i=1}^{s_d} |h_i|^2 \right)^{\frac{1}{s_d}} = \frac{1}{P_{ni} v_{AGC}} \left( \prod_{i=1}^{s_d} |h_i| \right)^{\frac{2}{s_d}} \quad [1]$$

where $s_d$ is the number of sub-channels having data.

In a third embodiment, the communication system includes a channel quality estimation module that determines the channel quality metric utilizing the preamble, wherein the channel quality metric is substantially equivalent to the normalized geometric mean of the squared magnitudes of the gain estimation, divided by the total noise-plus-interference power. A receiver in such communication system includes a RF processor and an baseband processor, wherein the baseband processor of the third embodiment distinguishes over the baseband processor of the first embodiment in the processing of the preamble to generate the channel quality metric and in design implementation. The baseband processor includes a channel quality estimation module having a data storage unit, a RF passband interference estimator and an accumulator. The data storage unit includes at least one logarithm table such that the logarithm of the gain estimation $h_i$ and the automatic gain control setting $v_{AGC}$ may be obtained. The RF passband interference estimator generates the total noise-plus-interference power $P_{ni}$ from the gain estimation $h_i$ and the complex noisy version of the long sequence binary phase shift keyed (BPSK) $\hat{LS}_i$ included in the preamble, as follows:

$$P_{ni} = \frac{s_d}{s} \sum_{i=1}^{s} |\hat{LS}_i - h_i LS_i|^2 \quad [2]$$

where s is the total number of subchannels, $s_d$ is the number of sub-channels having data, and the long sequence binary phase shift keyed (BPSK) symbol ($LS_i$) is inferred by the complex noisy version of the long sequence BPSK symbol ($\hat{LS}_i$).

The accumulator sums the logarithm of the gain estimation $h_i$ for each subchannel having data and subtracts the logarithm of the automatic gain control setting vAGO and the total noise-plus-interference power $P_{ni}$ such that the channel quality metric M(dB) of the third embodiment is as follows:

$$M_{(dB)} = \sum_{i=1}^{s_d} \frac{10}{s_d/2} \log_{10}(|h_i|) - 10\log_{10} v_{AGC} - 10\log_{10} P_{ni} \quad [3]$$

Therein, the channel quality metric M derived within the third embodiment is substantially equivalent to the normalized geometric mean of the squared magnitudes of the gain estimation $h_i$ of each of the sub-channels having data.

Advantages of this design include but are not limited to a communication system that transmits data in the form of a packet over a data channel that includes a channel quality estimation module for calculating a channel quality metric using only the preamble portion of the packet. Moreover, the channel quality metric computation requires only a single received packet for computation and, therefore, can be computed and updated quickly. Since it is computed using information in the packet preamble, the computation is independent of the data payload. This results in a consistent variance in the computed metric and also guarantees the quality of the metric even for very short packets. Furthermore, the communication system having such a channel quality metric module provides a timely estimate of channel quality on time-varying channels, making its application an ideal choice for wireless communications. Thus, the reliability of making a channel assessment increases. Additionally, the channel quality metric is simple to compute and, therefore, does not substantially increase the complexity of the receiver design. This metric can also be used where it is averaged over several packets.

These and other features and advantages of the present invention will be understood upon consideration of the following detailed description of the invention and the accompanying drawings.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein.

DETAILED DESCRIPTION OF PREFERRED EMBODIMENTS

The present invention will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
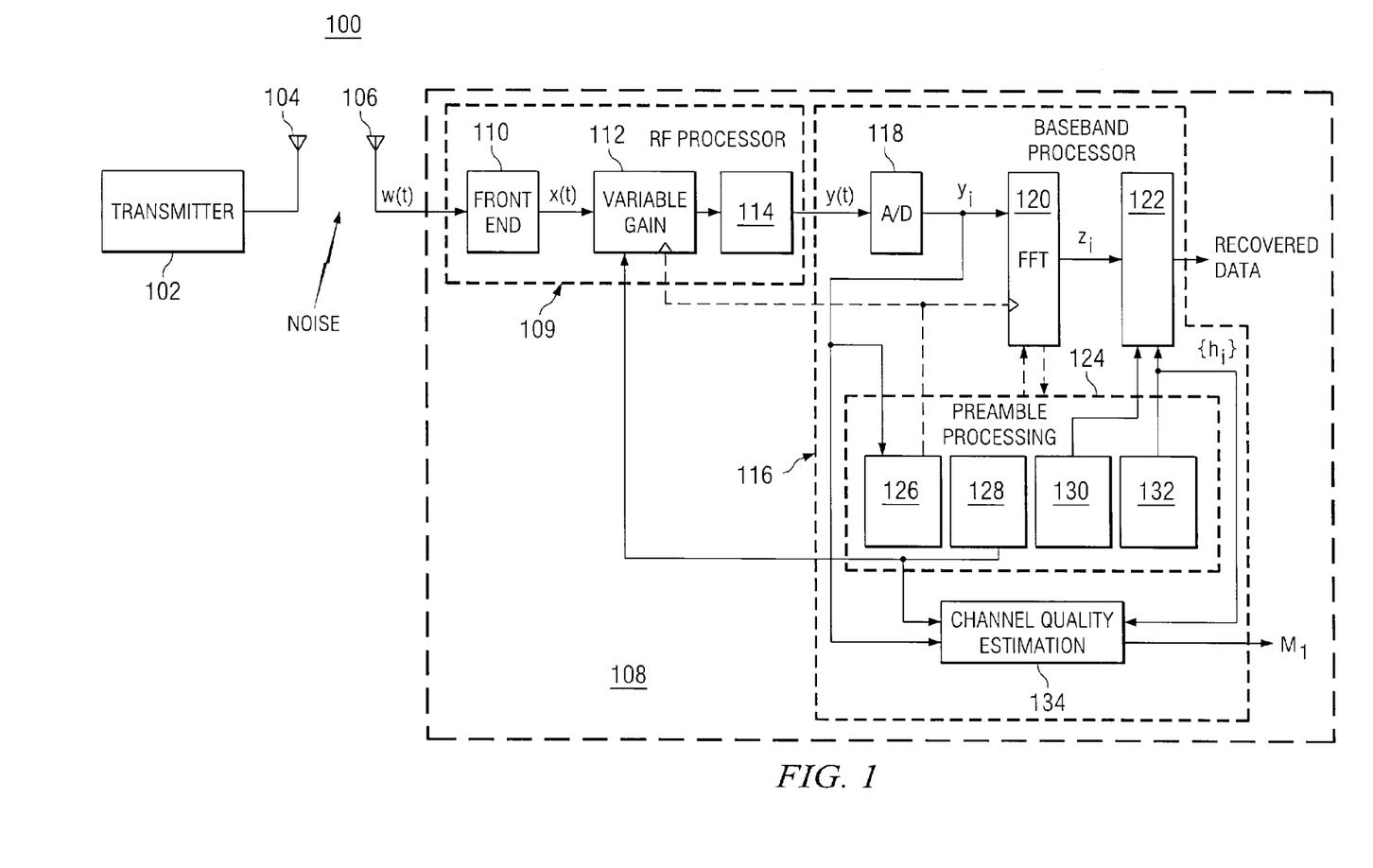
FIG. 1 illustrates a communication system in accordance with the present invention.

FIG. 1 depicts a high level block diagram of a radio communications system 100 in which the teachings of the present invention can be utilized. As shown, the radio system 100 includes a radio transmitter 102 having a transmit antenna 104 and a radio receiver 108. The radio receiver 108 includes a receive antenna 106, a radio frequency (RF) processor 109 and a baseband processor 116. Those skilled in the art should recognize that a receiver having a channel quality metric module in accordance with the present invention should not be limited to the inclusion of an antenna and a radio frequency processor. Specifically, a receiver including the teachings of the present invention may include solely a variable gain control and a baseband processor. More particularly, those skilled in the art would recognize that other components of the receiver may include a de-interleaver and a channel decoder (both not shown). Each of these modules can be constructed in accordance with conventional circuit design practices.

Particularly, radio transmitter 102 connects to the transmit antenna 104 to transmit an information signal to receiver 108. Receive antenna 106 connects to front end unit 110 to provide a processed antenna signal x(t). As shown, RF processor 109 includes a front end unit 110, a variable gain unit 112, and an demodulator 114, where the variable gain unit 112 couples between front end unit 110 and demodulator 114. Furthermore, baseband processor 116 includes an analog-to-digital converter (ADC) 118, a Fast Fourier Transform (FFT) unit 120, a sequence estimator 122, a preamble processing unit 124, and a channel quality estimation module 134. More particularly, ADC 118 connects to FFT unit 120, preamble processing unit 124 and channel quality estimation module 134. FFT unit 120 connects to sequence estimation 122 to supply EFT sequence $Z_i$ of the digital sample signal $y_i$. In general, FFT unit 120 extracts and demodulates sub-channel symbols to be provided to any one of modules 122, 128, 130 and 132. Preamble processing unit 124 connects to FFT unit 120 and variable gain unit 112 to provide control signaling. More particularly, preamble processing unit 124 includes a packet and preamble detect module 126, an energy measure gain set module 128, a frequency offset estimation module 130 and a subchannel gain estimation module 132. Specifically, packet and preamble detect module 126 connects to control variable gain unit 112 and FFT unit 120. Energy measure/gain set module 128 connects to variable gain unit 112 to provide variable gain control setting $v_{AGC}$. Sequence estimator 122 connects to receive the frequency offset from the frequency offset estimation module 130. Additionally, sub-channel gain estimation module 132 connects to sequence estimator 122 and channel quality estimation module 134 to provide gain estimation $h_i$.

In operation, transmitter 102 transmits an information signal (modulated at a carrier frequency $f_1$) from the transmit antenna 104. The transmitted signal reaches the radio receiver after passing through a propagation medium (e.g., a mobile radio channel). Data is transmitted in the form of packets sent over a data channel during a packet transmission. Each data channel includes a plurality of sub-channels. The packet comprises three distinct portions: a preamble, a header and a data payload portion. Each transmitted signal, as well as noise, are received at the receiver antenna 106 as the received modulated RF signal w(t). The received signal is processed by the RF processor 109 to produce a plurality of partially demodulated baseband signals y(t).

Specifically, the RF processor 109 amplifies, mixes, filters, samples, and quantizes the signal to extract a partially demodulated baseband signal y(t) corresponding to the carrier frequency $f_1$. Receiver front end unit 110 filters and amplifies the RF signal and converts it to an intermediate frequency (IF) signal x(t). Variable gain unit 112 amplifies the signal x(t) to provide a signal of constant energy to baseband processor 116. Demodulator 114 partially demodulates the signal to a provide partially demodulated baseband signal y(t) to the baseband processor 116 for further demodulation of the received modulated RF signal w(t). While a specific radio frequency processor architecture is provided for purposes of illustration, those skilled in the art will appreciate that other known architectures can be used (e.g., wideband digitization followed by digital channelization).

Through the processing of the preamble, header, and data payload portions of the packet sent, baseband processor 116 measures the energy/power of the signal received, calculates the gain estimation, and calculates the channel quality metric, among various other functions. Specifically, partially demodulated baseband signal y(t) is converted from analog to digital using ADC 118. Therein, the partially demodulated baseband signal y(t) is sampled and quantized to yield the discretetime signal $y_i$. Upon system initiation, preamble processor 124 couples to receive the discrete-time signal $y_i$. Upon the detection of the beginning of a packet, preamble processor 124 sends a control signal to FFT unit 120 as a form of notice that a preamble has been received. After system initiation, when the end of the preamble is detected by the preamble processor 124, preamble processor 124 sends another control signal to FFT unit 120 to process the header and data payload portions of the signal $y_i$. As stated previously, FFT unit 120 extracts and demodulates subchannel symbols, wherein such information may be provided to any one of modules 122, 128, 130 and 132 for further processing. In this manner, after a packet has been detected, the preamble is first processed to obtain all the information that is required to process the remainder of the packet (the header and the payload) Accordingly, FET unit 120 converts discrete-time signal $y_i$ into a corresponding FET sequence $Z_i$. Sequence estimator 122 processes sequence $Z_i$ for further processing known to those skilled in the art. In addition, sequence estimator 122 utilizes some processed variables from preamble processor 124 which also shall be described in detail.

Preamble processor 124 couples to receive the discrete-time signal $y_i$ such that each module 126-132 within processor 124 processes the discrete-time signal $y_i$. In a packet-based transmission, it is often necessary to know the beginning of the packet in order to establish proper timing since different portions of the packet are referenced from the beginning of the packet. The preamble is often used for this purpose—it usually contains a specific pattern of modulated symbols of which the receiver 108 is aware. Thus, packet and preamble detect module 126 continually looks for this pattern and when it is found the beginning of a packet is declared. Timing information is then established for the rest of the packet duration.

Specifically, the packet and preamble detect module 126 detects the beginning of a packet and the end of a preamble. This information is used to control variable gain unit 112 and FFT unit 120. Upon system initialization, the preamble of the packet is used to set the variable gain of unit 112. During operation of the system after system initialization, preamble processor 124 sends a control signal to variable gain unit 112 such that when packet and preamble detect module 126 detects the end of the preamble portion of signal $y_i$, variable gain unit 112 holds the automatic gain control setting $v_{AGC}$ in an effort to preserve the automatic gain control setting $v_{AGC}$ derived by module 128 for the remainder of the packet. When the beginning of a packet preamble is detected, however, preamble processor 124 sends another control signal to variable gain unit 112 to enable variable gain unit 112 to receive a newly generated automatic gain control setting $v_{AGC}$ derived by module 128.

Moreover, the energy measure/gain set module 128 measures the power of the discrete-time signal $y_i$ and generates the automatic gain control setting $v_{AGC}$ that is inversely proportional to the power detected. The automatic gain control setting $v_{VGC}$ is used to set the variable gain of unit 112 and preserve constant energy of the discrete time signal $y_i$. Accordingly, the setting of the variable gain unit 112 gives an indication of the power of the received signal w(t). Thereby, as shown, energy measure and gain set module 128 couples to variable gain unit 112. As described, when the beginning of the packet is detected by preamble processing unit 124, preamble processing unit 124 sends a control signal to variable gain unit 112. Thereby, the automatic gain control setting $v_{AGC}$ is sent to the variable gain unit 112 to set the gain that amplifies signal x(t). Frequency offset estimation module 130 estimates the frequency offset of discretetime signal $y_i$ and relays this information to sequence estimator 122. The automatic gain control setting $v_{AGC}$, however, must be set prior to the frequency offset estimation. Sub-channel gain estimation module 132 estimates the gain estimation $h_i$ for each sub-channel and relays the gain estimation $h_i$ to both the sequence estimator 122 and channel quality estimation module 134 to ensure that, in the subsequent processing of the sequence $y_i$, specific impairments of the wireless channel are compensated for and to calculate a channel quality metric M, respectively. The preamble often contains specific symbol patterns that facilitate the estimation of these specific channel impairments. The Viterbi algorithm is very popular for implementing sequence estimator 122 which requires information that is provided by the preamble processing unit 124 as it extracts the binary information from discrete FFT sequence $Z_i$.

Channel quality estimation module 134 couples to receive the discrete-time signal $y_i$, along with the automatic gain control setting $v_{AGC}$ and the gain estimation $h_i$ to perform its calculation of channel quality metric M. In this first embodiment, the calculated channel quality metric. M represents the normalized geometric mean of the squared magnitudes of the gain estimation $h_i$ for the subchannels carrying data $s_d$, as follows:

$$M = \frac{1}{P_{ni} v_{AGC}} \left( \prod_{i=1}^{s_d} |h_i|^2 \right)^{\frac{1}{s_d}} = \frac{1}{P_{ni} v_{AGC}} \left( \prod_{i=1}^{s_d} |h_i| \right)^{\frac{2}{s_d}} \quad [1]$$

where $s_d$ is the number of subchannels having data, $h_i$ is the gain estimation, $v_{AGC}$ is the automatic gain control setting, and $P_{ni}$ is the total noise-plus-interference power. Note, however, that the total noise-plus-interference power $P_{ni}$ is only necessary when interference exists within the communication channel. Thus, the channel quality metric M may be derived without the total noise-plusinterference power $P_{ni}$.

Channel quality metric M is intended to capture the short-term capacity of the wireless channel. Thus, since a multicarrier channel is substantially the equivalent of a plurality of single-carrier channels, the channel quality metric M in a multicarrier channel communication system is equivalent in premise to the sum of the short-term capacities of the individual sub-channels.

In systems compliant with IEEE standards 802.11a and 802.11g. there are typically 48 sub-channels carrying data. The gain from each of the four pilot sub-channels are ignored since those sub-channels do not carry any data in the data payload portion of the packet. As such, the channel quality metric M is as follows:

$$M = \frac{1}{P_{ni} v_{AGC}} \left( \prod_{i=1}^{48} |h_i|^2 \right)^{\frac{1}{48}} = \frac{1}{P_{ni} v_{AGC}} \left( \prod_{i=1}^{48} |h_i| \right)^{\frac{1}{24}} \quad [4]$$

Radio frequency interference (RFI) in the passband of the wireless communication system is accounted for by dividing normalized geometric mean of the squared magnitudes of the gain estimation $h_i$ by the total noise-plus-interference power $P_{ni}$. As such, the channel quality metric M exhibits improved reliability using the time-varying RFI. In an OEDM physical layer implementation compliant with IEEE standard 802.11, it is possible to obtain a reasonably accurate estimate of the sum of the RFI power and the thermal noise power by using a mean-square error (MSE) computation for the total number of sub-channels having known binary-phase-shift-keyed (BPSK) symbols in the Long Sequence $LS_i$, which is defined in the physical layer convergence procedure (PLCP) for the preamble of packets in compliance with the IEEE standards, 802.11a and 802.11g. The Long Sequence $LS_i$ is only available after some portion of the preamble has been processed by FFT unit 120. Operating on the assumption that both the thermal noise and RFI have a flat power spectral density (PSD) over the total number of sub-channels, an average of the MSE value for each sub-channel may be taken to estimate the noise-plus-interference power in a single subchannel (i) This average is multiplied by the number of sub-channels having data thereon. Thus, an estimate of the total noise-plus-interference power $P_{ni}$ attributable to the data-carrying sub-channels is derived. Long sequence binary phase shift keyed (BPSK) symbol ($LS_i$) represents that which is carried by the preamble of the data packet to be sent on the sub-channel before the inverse Fast Fourier Transform (IFFT) operation is performed at the transmitter 102. The complex noisy version of the long sequence BPSK symbol ($\hat{LS}_i$) represents that which is the received at receiver 108. The total noiseplus-interference power $P_{ni}$ can be estimated as the following:

$$P_{ni} = \frac{s_d}{s}\sum_{i=1}^{s} |\hat{LS}_i - h_i LS_i|^2 \qquad [2]$$

where s is the total number of subchannels, $s_d$ is the number of sub-channels having data, and the long sequence binary phase shift keyed (BPSK) symbol ($LS_i$) is inferred by the complex noisy version of the long sequence BPSK symbol ($\hat{LS}_i$). Therefore, in systems compliant with IEEE standards 802.11a and 802.11g. the total noise-plus-interference power $P_{ni}$ is as follows:

$$P_{ni} = \frac{48}{52}\sum_{i=1}^{52} |\hat{LS}_i - h_i LS_i|^2. \qquad [5]$$

These expressions can easily be modified for physical layer implementations having a different number of sub-carriers in either the preamble or the data payload portions of the packet. With the improved expression, any thresholds that are used to qualify the channel can be identical from radio to radio.

Figure 2:
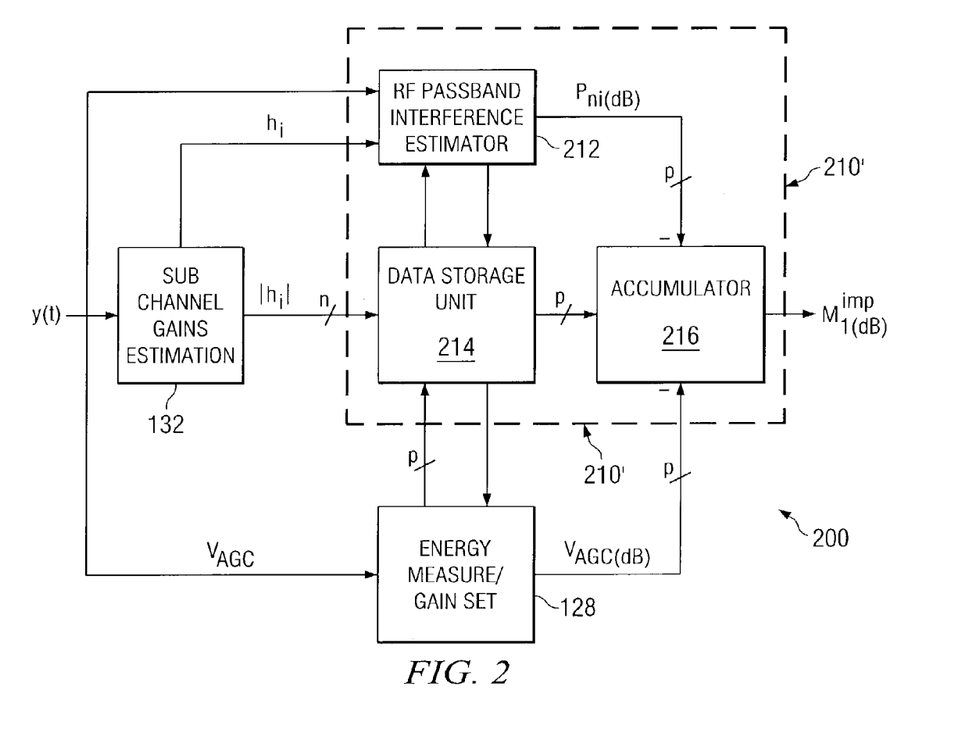
FIG. 2 displays the channel estimation module within a second embodiment of a communication system in accordance with the present invention.

In a second embodiment, as shown in FIG. 2, a channel quality estimation module 210 includes a RF passband interference estimator module 212, a data storage unit 214 and an accumulator 216. Channel quality estimation module 210 substitutes for the channel quality estimation module 134 of FIG. 1, wherein the channel quality metric M in equation [1] may be simplified as follows:

$$M_{(dB)} = \sum_{i=1}^{s_d} \frac{10}{s_d/2}\log_{10}(|h_i|) - 10\log_{10}v_{AGC} - 10\log_{10}P_{ni}. \qquad [3]$$

There are numerous ways that this equation may be implemented. In this second embodiment, the data storage unit 214 includes at least one logarithm mapping table. Data storage unit 214 may be implemented using any memory device, including but not limited to, a read only memory (ROM) and a programmable memory. Data storage unit 214 connects to the sub-channel gains estimation module 132 and the energy measure/gain set module 128 to provide the logarithm value of the gain estimation $h_{i(dB)}$ and the automatic gain control setting $v_{AGC}$(dB), respectively. In addition, data storage unit 214 connects to RF passband interference estimator module 212 to provide the logarithm value of the total noise-plus-interference power $P_{ni(dB)}$. The second embodiment provides a simple solution for calculating the channel quality metric M that is substantially equivalent to the normalized geometric mean of the squared magnitudes of the gain estimation $h_i$ for the sub-channels carrying data $s_d$.

In systems compliant with IEEE standards 802.11a and 802.11g, there are typically 48 sub-channels carrying data. As such, the channel quality metric M is as follows:

$$M_{(dB)} = \sum_{i=1}^{48} \frac{10}{24}\log_{10}(|h_i|) - 10\log_{10}v_{AGC} - 10\log_{10}P_{ni}. \qquad [6]$$

A third embodiment may be implemented solely in software where the central processing unit calculates M as in equations [1] and [3]. A fourth embodiment may be comprised of both hardware and software where a central processing unit substitutes for the data storage unit 214 and the accumulator 216 to calculate channel quality metric $M_{(dB)}$. Moreover, another embodiment may compute an equivalent metric similar to metric M by computing the geometric mean of linear functions of squared magnitudes of the gain estimation. The metric M for such a system is a follows:

$$M = \frac{1}{P_{ni}v_{AGC}}\left(\prod_{i=1}^{s_d} |\alpha h_i|^2\right)^{\frac{1}{s_d}} = \frac{1}{P_{ni}v_{AGC}}\left(\prod_{i=1}^{s_d} |\alpha h_i|\right)^{\frac{2}{s_d}} \qquad [7]$$

where α is some real number.

Though the invention has been illustrated with respect to an OFDM system, those skilled in the art will appreciate that the invention is applicable to any multicarrier system that includes a channel quality estimation component. Furthermore, the present invention can be implemented in systems including multicarrier code division multiple access (MC-CDMA), orthogonal frequency division multiple access (OFDMA), asymmetric digital subscriber line (ADSL), digital audio broadcast (DAB) and other similar systems.

The channel quality metrics for packet-based multicarrier physical layers have been described with reference to systems compliant with IEEE standards 802.11a and 802.11g. Those skilled in the art would recognize that the computation of the channel quality metric in the first and second embodiment should not be limited to such systems having packet-based multicarrier physical layers in systems compliant with IEEE standards 802.11a and 802.11g. The computation and implementation of channel quality metric processing may be implemented in other multicarrier systems. Furthermore, the novel implementation of the channel quality metric implementation is applicable to both wired and wireless communication systems.

Those of skill in the art will recognize that the physical location of the elements illustrated in FIGS. 1 and 2 can be moved or relocated while retaining the function described above.

Advantages of this design include but are not limited to a communication system that transmits data in the form of a packet over a data channel that includes a channel quality estimation module for calculating a channel quality metric computed from information available within the physical layer preamble. Thus, its computation is independent of packet length. This results in a consistent variance in the computed metric and also guarantees the quality of the metric even for very short packets. Thus, the reliability of making a channel assessment increases. Therefore, the implementation of the channel quality metric provides a reliable assessment of the instantaneous channel quality based upon the reception of a single packet. Moreover, the channel quality metric is simple to compute and, therefore, does not substantially increase the complexity of the receiver design. In addition, early channel quality metric generation enables a communication system to power down the receiver 108 for the remainder of the current packet to conserve power if it is determined, from the estimate, that the likelihood of the packet payload being correctly decoded by the sequence estimator is very low.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

We claim:

1. A baseband processor for processing a plurality of baseband sample signals derived by demodulating data transmitted in the form of a packet sent over a data channel during a packet transmission in a multicarrier Orthogonal Frequency Division Multiplexing (OFDM) communication system having a plurality of subchannels, wherein each packet includes a preamble, a header, and a data payload, comprising:

an analog-to-digital converter to convert the baseband sample signal into a digital baseband sample signal wherein the preamble includes a plurality of subchannel symbols;

an energy measure/gain set module coupled to a variable gain unit for providing a variable gain control setting $v_{AGC}$ which is inversely proportional to a short-term average received signal power and not equal to 1;

a preamble processing module coupled to the analog-to-digital converter to receive the digital baseband sample signal, the preamble processing module including a sub-channel gain estimation module coupled to receive the digital baseband sample signal to estimate the gain estimation ($h_i$) for each sub-channel; and a channel quality estimation module that generates a channel quality estimation metric (M) that is equivalent to the normalized geometric mean of the squared magnitudes of the gain estimation ($h_i$) of each of the plurality of subchannels carrying data such that, $$M = \frac{1}{v_{AGC}} \left( \prod_{i=1}^{s_d} |h_i|^2 \right)^{\frac{1}{s_d}} = \frac{1}{v_{AGC}} \left( \prod_{i=1}^{s_d} |h_i| \right)^{\frac{2}{s_d}}$$

where $s_d$ is the number of sub-channels having data.

2. A receiver for demodulating data transmitted in the form of a packet sent over a data channel during a packet transmission in a multicarrier Orthogonal Frequency Division Multiplexing (OFDM) communication system, each data channel having a plurality of sub-channels, each packet including a preamble, a header and a data payload, the receiver comprising:

a variable gain module coupled to receive each packet transmitted to provide a plurality of baseband sample signals; and a baseband processor coupled to the variable gain module for processing the plurality of baseband sample signals to measure the power of the signals, to derive a variable gain control setting ($v_{AGC}$) for the variable gain module, and to calculate a gain estimation ($h_i$) of each sub-channel, the variable gain module couples to receive the variable gain control setting ($v_{AGC}$) from the baseband processor during the processing of the preamble, wherein the variable gain control setting is inversely proportional to a short-term average received signal power;

wherein the baseband processor generates a channel quality estimation metric (M) that is equivalent to the normalized geometric mean of the squared magnitudes of the gain estimation ($h_i$) of each of the plurality of sub-channels carrying data such that, $$M = \frac{1}{v_{AGC}} \left( \prod_{i=1}^{s_d} |h_i|^2 \right)^{\frac{1}{s_d}} = \frac{1}{v_{AGC}} \left( \prod_{i=1}^{s_d} |h_i| \right)^{\frac{2}{s_d}}$$

where $s_d$ is the number of sub-channels having data and $v_{ACC}$ not equal to 1.

3. A receiver for demodulating data transmitted in the form of a packet sent over a data channel during a packet transmission in a multicarrier Orthogonal Frequency Division Multiplexing (OFDM) communication system, each data channel having a plurality of sub-channels, each packet including a preamble, a header and a data payload, the receiver comprising:

at least one antenna element for receiving a radio frequency (RF) signal and providing a corresponding antenna signal;

a RF processor coupled to the at least one antenna element for processing the antenna signal to provide a plurality of baseband sample signals; and a baseband processor coupled to the RF processor for processing the plurality of baseband sample signals to measure the power of the RF signal, to derive a variable gain control setting ($v_{AGC}$) for the RF processor, and to calculate a gain estimation ($h_i$) of each sub-channel, the RF processor couples to receive the variable gain control setting ($v_{AGC}$) from the baseband processor during the processing of the preamble, wherein the variable gain control setting is inversely proportional to the power of the RF signal;

wherein the baseband processor generates a channel quality estimation metric (M) that is equivalent to the normalized geometric mean of the squared magnitudes of the gain estimation ($h_i$) of each of the plurality of sub-channels carrying data divided by the total noise-plus-interference power ($P_{ni}$) such that, $$M = \frac{1}{v_{AGC}} \left( \prod_{i=1}^{s_d} |h_i|^2 \right)^{\frac{1}{s_d}} = \frac{1}{v_{AGC}} \left( \prod_{i=1}^{s_d} |h_i| \right)^{\frac{2}{s_d}}$$

where $s_d$ is the number of sub-channels having data and $v_{AGC}$ not equal to 1.

4. A receiver as recited in claim 3, wherein the RF processor comprises:
   a front end module coupled to receive the antenna signal to process the signal;
   a variable gain module coupled to receive the processed antenna signal and the automatic gain control setting ($v_{AGC}$) to amplify the processed antenna signal using the automatic gain control setting ($v_{AGC}$); and
   a demodulator coupled to receive the amplified signal to partially demodulate the signal into a plurality of baseband sample signals.

5. A receiver for demodulating data transmitted in the form of a packet sent over a data channel during a packet transmission, each data channel having a plurality of sub-channels, each packet including a preamble, a header and a data payload, comprising:
   at least one antenna element for receiving a radio frequency (RF) signal and providing a corresponding antenna signal;
   a RF processor coupled to the at least one antenna element for processing the antenna signal to provide a plurality of baseband sample signals; and
   a baseband processor coupled to the RF processor for processing the plurality of baseband sample signals to measure the power of the RF signal, to provide a variable gain control setting ($v_{AGC}$) for the RF processor, to provide a gain estimation ($h_i$) of each sub-channel, and to calculate the total noise-plus-interference power ($P_{ni}$), the RF processor couples to receive the variable gain control setting ($v_{AGC}$) from the baseband processor during the processing of the preamble, wherein the variable gain control setting is inversely proportional to the power of the RF signal;
   wherein the baseband processor generates a channel quality estimation metric that is substantially equivalent to the normalized geometric mean of the squared magnitudes of the gain estimation ($h_i$) of the plurality of sub-channels carrying data divided by the total noise-plus-interference power ($P_{ni}$).

6. A receiver as recited in claim 5, wherein the packet is an OFDM symbol block.

7. A receiver as recited in claim 5, wherein the RF processor comprises:
   a front end module coupled to receive the antenna signal to process the signal;
   a variable gain module coupled to receive the processed antenna signal and the automatic gain control setting ($v_{AGC}$) to amplify the processed antenna signal using the automatic gain control setting ($v_{AGC}$); and
   a demodulator coupled to receive the amplified signal to partially demodulate the signal into a plurality of baseband sample signals.

8. The receiver as recited in claim 5, wherein the baseband processor comprises:
   an analog-to-digital converter to convert the baseband sample signal into a digital baseband sample signal wherein the preamble includes the plurality of sub-channel symbols;
   a Fast Fourier transform (FFT) unit coupled to receive the digital baseband sample signal extract and demodulate the plurality of sub-channel symbols from the preamble and to produce a discrete FFT sequence of the header and the data payload after the preamble has been processed;
   a sequence estimator coupled to the FFT unit to receive the discrete FFT sequence of the header and the data payload for error correction when a convolutional encoder is used to encode the data prior to transmission
   a preamble processing module coupled to the analog-to-digital converter to receive the digital baseband sample signal, the preamble processing module comprises,
      a packet and preamble detection module coupled to receive the digital baseband sample signal to detect the beginning of a packet and end of a preamble,
      an energy measure and gain set module coupled to receive the digital baseband sample signal to measure the power of the digital baseband sample signal and generate the variable gain control setting ($v_{AGC}$) inversely proportional to the power,
      a frequency offset estimation module coupled to receive the digital baseband sample signal to estimate the frequency offset, and
      a sub-channel gain estimation module coupled to receive the digital baseband sample signal to estimate the gain estimation ($h_i$) for each sub-channel,
   wherein the sequence estimator coupled to the preamble processing module to receive the frequency offset and the gain estimation for error correction of the discrete FFT sequence of the header and the data payload,
   wherein the preamble processing module coupled to the RF processor to enable the RF processor to receive the variable gain control setting ($v_{AGC}$) when the preamble processing module detects the beginning of a data packet and to disable the RF processor from receiving the variable gain control setting ($v_{AGC}$) when the preamble processing module detects the end of the preamble to maintain the variable gain control setting for the packet during the processing of the header and the data payload,
   wherein the preamble processing module coupled to the FFT unit send control signals when the beginning of the packet is detected for processing of the preamble and when the end of the preamble is detected for processing of the header and the data payload; and
   a channel quality estimation module coupled to receive the preamble to generate the total noise-plus-interference power, the channel quality estimation module coupled to the energy measure gain set module to receive the variable gain control setting ($v_{AGC}$), the channel quality estimation module coupled to the sub-channel gain estimation module to receive the gain estimation ($h_i$) for each sub-channel and produce the channel quality estimation metric (M) that is substantially equivalent to the normalized geometric mean of the squared magnitudes of the gain estimation ($h_i$) of the plurality of sub-channels carrying data divided by the total noise-plus-interference power ($P_{ni}$).

9. The receiver as recited in claim 8, wherein the channel quality estimation module comprises:
a data storage unit having at least one logarithm table, the data storage unit coupled to the energy measure gain set module to provide the logarithm of the automatic gain control setting ($v_{AGC}$), the data storage unit coupled to the sub-channel gain estimation module to provide the logarithm of the gain estimation ($h_i$);
a RF passband interference estimator coupled to receive the gain estimation ($h_i$) and the preamble to provide a total noise-plus-interference power ($P_{ni}$); and
an accumulator coupled to receive the logarithm of the gain estimation ($h_i$), the logarithm of the automatic gain control selling ($v_{AGC}$), and the total noise-plus-interference power ($P_{ni}$) to sum the logarithm of the gain estimation ($h_i$) for each sub-channel, subtracting the logarithm of the automatic gain control voltage ($v_{AGC}$) and the total noise-plus-interference power ($P_{ni}$), the sum equal to the channel quality estimation metric $M_{(dB)}$, wherein, $$M_{(dB)} = \sum_{i=1}^{s_d} \frac{10}{\frac{s_d}{2}} \log_{10}(|h_i|) - 10\log_{10} v_{AGC} - 10\log_{10} P_{ni}$$

where $s_d$ is the number of sub-channels having data.

10. The receiver as recited in claim 9, wherein the data storage unit is a read-only memory (ROM), having at least one logarithm mapping table stored thereon.

11. The receiver as recited in claim 9, wherein the RF passband interference estimator couples to receive the gain estimation ($h_i$) and the preamble wherein the preamble includes a plurality of sub-channel symbols, wherein a portion of the plurality of sub-channel symbols is a complex noisy version of a long sequence binary phase shift keyed (BPSK) symbol ($\hat{LS}_i$) to derive the total noise-plus-interference power ($P_{ni}$), wherein:

$$P_{ni} = \frac{s_d}{s} \sum_{i=1}^{s} |\hat{LS}_i - h_i LS_i|^2$$

where s is the total number of sub-channels, $s_d$ is the number of sub-channels having data, and the long sequence binary phase shift keyed (BPSK) symbol ($LS_i$) is inferred by the complex noisy version of the long sequence BPSK symbol ($\hat{LS}_i$).

12. A baseband processor for demodulating data transmitted in the form of a packet sent over a data channel during a packet transmission, each data channel having a plurality of sub-channels, each of the plurality of sub-channels having a predetermined carrier frequency, each packet including a preamble, header and data payload, each packet sent on a sub-channel, a RF processor coupled to receive the data and provide a plurality of baseband sample signals, the baseband processor coupled to receive the plurality of baseband sample signals, the baseband processor, comprising:

an analog to digital converter to convert the baseband sample signal into a digital baseband sample signal wherein the preamble includes the plurality of sub-channel symbols;

a Fast Fourier transform (FFT) unit coupled to receive the digital baseband sample signal extract and demodulate the plurality of sub-channel symbols from the preamble and to produce a discrete FFT sequence of the header and the data payload after the preamble has been processed;

a sequence estimator coupled to the FFT unit to receive the discrete FFT sequence of the header and the data payload for error correction when a convolutional encoder is used to encode the data prior to transmission;

a preamble processing module coupled to the analog-to-digital converter to receive the digital baseband sample signal, the preamble processing module comprises,
a packet and preamble detection module coupled to receive the digital baseband sample signal to detect the beginning of a packet and end of a preamble,
an energy measure and gain set module coupled to receive the digital baseband sample signal to measure the power of the digital baseband sample signal and generate the variable gain control setting ($v_{AGC}$) inversely proportional to the power,
a frequency offset estimation module coupled to receive the digital baseband sample signal to estimate the frequency offset, and
a sub-channel gain estimation module coupled to receive the digital baseband sample signal to estimate the gain estimation ($h_i$) for each sub-channel,
wherein the sequence estimator coupled to the preamble processing module to receive the frequency offset and the gain estimation for error correction of the discrete FFT sequence of the header and the data payload,
wherein the preamble processing module coupled to the RF processor to enable the RF processor to receive the variable gain control setting ($v_{AGC}$) when the preamble processing module detects the beginning of a data packet and to disable the RF processor from receiving the variable gain control setting ($v_{AGC}$) when the preamble processing module detects the end of the preamble to maintain the variable gain control setting for the packet during the processing of the header and the data payload,
wherein the preamble processing module coupled to the FFT unit sends control signals when the beginning of the packet is detected for processing of the preamble and when the end of the preamble is detected for processing of the header and the data payload; and a channel quality estimation module coupled to receive the preamble to generate the total noise-plus-interference power, the channel quality estimation module coupled to the energy measure gain set module to receive the variable gain control setting ($v_{AGC}$), the channel quality estimation module coupled to the sub-channel gain estimation module to receive the gain estimation ($h_i$) for each sub-channel and produce the channel quality estimation metric (M) that is substantially equivalent to the normalized geometric mean of the squared magnitudes of the gain estimation ($h_i$) of the plurality of sub-channels carrying data divided by the total noise-plus-interference power ($P_{ni}$).

13. A baseband processor as recited in claim 12, wherein the channel quality estimation module comprises:

a data storage unit having at least one logarithm table, the data storage unit coupled to the energy measure gain set module to provide the logarithm of the automatic gain control setting ($v_{AGC}$), the data storage unit coupled to the sub-channel gain estimation module to provide the logarithm of the gain estimation ($h_i$);

a RF passband interference estimator coupled to receive the gain estimation ($h_i$) and the preamble to provide a total noise-plus-interference power ($P_{ni}$); and an accumulator coupled to receive the logarithm of the gain estimation ($h_i$), the logarithm of the automatic gain control setting ($v_{AGC}$), and the total noise-plus-interference power ($P_{ni}$) to sum the logarithm of the gain estimation ($h_i$) for each sub-channel, subtracting the logarithm of the automatic gain control voltage ($v_{AGC}$) and the total noise-plus-interference power ($P_{ni}$), the sum equal to the channel quality estimation metric $M_{(dB)}$, wherein, $$M_{(dB)} = \sum_{i=1}^{s_d} \frac{10}{\frac{s_d}{2}} \log_{10}(|h_i|) - 10\log_{10} v_{AGC} - 10\log_{10} P_{ni}$$

where $s_d$ is the number of sub-channels having data.

14. The baseband processor as recited in claim 12, wherein the RF passband interference estimator couples to receive the gain estimation ($h_i$) and the preamble wherein the preamble includes a plurality of sub-channel symbols, wherein a portion of the plurality of sub-channel symbols is a complex noisy version of a long sequence binary phase shift keyed (BPSK) symbol ($\hat{L}\hat{S}_i$) to derive the total noise-plus-interference power ($P_{ni}$), wherein:

$$P_{ni} = \frac{s_d}{s} \sum_{i=1}^{s} |\hat{L}\hat{S}_i - h_i LS_i|^2$$

where s is the total number of sub-channels, $s_d$ is the number of sub-channels having data, and the long sequence binary phase shift keyed (BPSK) symbol ($LS_i$) is inferred by the complex noisy version of the long sequence BPSK symbol ($\hat{L}\hat{S}_i$).

15. A channel estimator for use in a communications system wherein data transmitted in the form of a packet sent over a data channel during a packet transmission, wherein each packet includes a preamble, a header and a data payload, the channel estimator coupled to receive an estimation gain ($h_i$) for each sub-channel and an automatic gain control setting ($v_{AGC}$), the channel estimator comprising:

a RF passband interference estimator coupled to receive the gain estimation ($h_i$) and the preamble to provide a total noise-plus-interference power ($P_{ni}$); and a processor that generates a channel quality estimation metric (M) that is equivalent to the normalized geometric mean of the squared magnitudes of the gain estimation of each of the plurality of sub-channels carrying data divided by the total noise-plus-interference power ($P_{ni}$) such that, $$M = \frac{1}{P_{ni} v_{AGC}} \left( \prod_{i=1}^{s_d} |h_i|^2 \right)^{\frac{1}{s_d}} = \frac{1}{P_{ni} v_{AGC}} \left( \prod_{i=1}^{s_d} |h_i| \right)^{\frac{2}{s_d}}$$

where $s_d$ is the number of sub-channels having data.

16. The channel estimator as recited in claim 15, wherein the RF passband interference estimator couples to receive the gain estimation ($h_i$) and the preamble wherein the preamble includes a plurality of sub-channel symbols, wherein a portion of the plurality of sub-channel symbols is a complex noisy version of a long sequence binary phase shift keyed (BPSK) symbol ($\hat{L}\hat{S}_i$) to derive the total noise-plus-interference power ($P_{ni}$), wherein:

$$P_{ni} = \frac{s_d}{s} \sum_{i=1}^{s} |\hat{L}\hat{S}_i - h_i LS_i|^2$$

where s is the total number of sub-channels, $s_d$ is the number of sub-channels having data, and the long sequence binary phase shift keyed (BPSK) symbol ($LS_i$) is inferred by the complex noisy version of the long sequence BPSK symbol ($\hat{L}\hat{S}_i$).

17. A channel estimator for use in a communications system wherein data transmitted in the form of a packet sent over a data channel during a packet transmission, wherein each packet includes a preamble, a header and a data payload, the channel estimator coupled to receive an estimation gain ($h_i$) for each sub-channel and an automatic gain control setting ($v_{AGC}$), the channel estimator comprising:

a data storage unit having at least one logarithm table, wherein the energy measure gain set module coupled to the data storage unit to provide the logarithm of the automatic gain control setting ($v_{AGC}$), the sub-channel gain estimation module coupled to the data storage unit to provide the logarithm of the gain estimation ($h_i$);

a RF passband interference estimator coupled to receive the gain estimation ($h_i$) and the preamble to provide a total noise-plus-interference power ($P_{ni}$); and an accumulator coupled to receive the logarithm of the gain estimation ($h_i$), the logarithm of the automatic gain control setting ($v_{AGC}$)I and the total noise-plus-interference power ($P_{ni}$) to sum the logarithm of the gain estimation ($h_i$) for each sub-channel, subtracting the logarithm of the automatic gain control voltage ($v_{AGC}$) and the total noise-plus-interference power ($P_{ni}$), the sum equal to the channel quality estimation metric $M_{(dB)}$, wherein, $$M_{(dB)} = \sum_{i=1}^{s_d} \frac{10}{\frac{s_d}{2}} \log_{10}(|h_i|) - 10\log_{10} v_{AGC} - 10\log_{10} P_{ni}$$

where $s_d$ is the number of sub-channels having data.

18. The channel estimator as recited in claim 17, wherein the RF pasaband interference estimator couples to receive the gain estimation ($h_i$) and the preamble wherein the preamble includes a plurality of sub-channel symbols, wherein a portion of the plurality of sub-channel symbols is a complex noisy version of a long sequence binary phase shift keyed (BPSK) symbol ($\hat{L\hat{S}}_i$) to derive the total noise-plus-interference power ($P_{ni}$), wherein:

$$P_{ni} = \frac{s_d}{s}\sum_{i=1}^{s}|\hat{L\hat{S}}_i - h_i LS_i|^2$$

where s is the total number of sub-channels, $s_d$ is the number of sub-channels having data, and the long sequence binary phase shift keyed (BPSK) symbol ($LS_i$) is inferred by the complex noisy version of the long sequence BPSK symbol ($\hat{L\hat{S}}_i$).

19. A method of performing channel estimation for a packet received by a receiving network node over a data channel during a packet transmission by a transmitting network node, each data channel having a plurality of sub-channels, each of the plurality of sub-channels having a predetermined carrier frequency, each packet having a preamble, a header and a data payload, comprising the steps of:
generating the gain estimation ($h_i$) for each sub-channel;
generating the automatic gain control voltage ($v_{AGC}$) for each packet;
generating the total noise-plus-interference power ($P_{ni}$) for each packet using the gain estimation ($h_i$) and the preamble;
generating the geometric mean for each packet using the gain estimation, the automatic gain control voltage/setting and the total noise-plus-interference, wherein the geometric mean is the channel quality estimation metric, M $$M = \frac{1}{P_{ni}v_{AGC}}\left(\prod_{i=1}^{s_d}|h_i|^2\right)^{\frac{1}{s_d}} = \frac{1}{P_{ni}v_{AGC}}\left(\prod_{i=1}^{s_d}|h_i|\right)^{\frac{2}{s_d}}$$

where $s_d$ is the number of sub-channels having data.

20. A method of performing channel estimation for a packet received by a receiving network node over a data channel during a packet transmission by a transmitting network node, each data channel having a plurality of sub-channels, each of the plurality of sub-channels having a predetermined carrier frequency, each packet having a preamble, a header and a data payload, comprising the steps of:
generating the gain estimation ($h_i$) for each sub-channel from the preamble;
generating the automatic gain control voltage ($v_{AGC}$) for each packet from the preamble;
generating the total noise-plus-interference power ($P_{ni}$) for each packet using the gain estimation ($h_i$) and the preamble;
retrieving the logarithm of the gain estimation ($h_i$) from a data storage unit for each sub-channel;
retrieving the logarithm of the automatic gain control voltage ($v_{AGC}$) from a data storage unit;
generating the channel quality estimation metric M for each packet using the logarithm of the gain estimation ($h_i$), the logarithm of the automatic gain control setting ($v_{AGC}$), and the total noise-plus-interference power ($P_{ni}$) to sum the logarithm of the gain estimation ($h_i$) for each sub-channel, subtracting the logarithm of the automatic gain control voltage ($v_{AGC}$) and the total noise-plus-interference power ($P_{ni}$), the sum equal to the channel quality estimation metric $M_{(db)}$ wherein, $$M_{(dB)} = \sum_{i=1}^{s_d}\frac{10}{\frac{s_d}{2}}\log_{10}(|h_i|) - 10\log_{10}P_{ni}$$

where $s_d$ is the number of sub-channels having data.

21. A method as recited in claim 19, wherein the preamble includes a complex noisy version of a long sequence binary phase shift keyed (BPSK) symbol ($\hat{L\hat{S}}_i$) and the step for generating the total noise-plus-interference power ($P_{ni}$) for each packet uses the gain estimation ($h_i$) and the complex noisy version of the long sequence BPSK symbol ($\hat{L\hat{S}}_i$), wherein:

$$P_{ni} = \frac{s_d}{s}\sum_{i=1}^{s}|\hat{L\hat{S}}_i - h_i LS_i|^2$$

where s is the total number of sub-channels, $s_d$ is the number of sub-channels having data, and the long sequence binary phase shift keyed (BPSK) symbol ($LS_i$) is inferred by the complex noisy version of the long sequence BPSK symbol ($\hat{L\hat{S}}_i$).

22. A method as recited in claim 21, wherein the preamble includes a complex noisy version of a long sequence binary phase shift keyed (BPSK) symbol ($\hat{L\hat{S}}_i$) and the step for generating the total noise-plus-interference power ($P_{ni}$) for each packet uses the gain estimation ($h_i$) and the complex noisy version of the long sequence BPSK symbol ($\hat{L\hat{S}}_i$), wherein:

$$P_{ni} = \frac{s_d}{s}\sum_{i=1}^{s}|\hat{L\hat{S}}_i - h_i LS_i|^2$$

where s is the total number of sub-channels, $s_d$ is the number of sub-channels having data, and the long sequence binary phase shift keyed (BPSK) symbol ($LS_i$) is inferred by the complex noisy version of the long sequence BPSK symbol ($\hat{L\hat{S}}_i$).

* * * * *